United States Patent
Tiby

[19]
[11] Patent Number: 6,038,870
[45] Date of Patent: Mar. 21, 2000

[54] DEVICE FOR MONITORING THE PREVAILING TEMPERATURE IN AN ENCLOSURE SUCH AS A HOUSEHOLD REFRIGERATOR

[75] Inventor: Gérard Tiby, Sucy-en-Brie, France

[73] Assignee: Premark Feg L.L.C., Wilmington, Del.

[21] Appl. No.: 08/837,000

[22] PCT Filed: Nov. 9, 1995

[86] PCT No.: PCT/FR95/01482

§ 371 Date: May 9, 1997

§ 102(e) Date: May 9, 1997

[87] PCT Pub. No.: WO96/15432

PCT Pub. Date: May 23, 1996

[30] Foreign Application Priority Data

Nov. 10, 1994 [FR] France .................................. 94 13580

[51] Int. Cl.[7] .................................................. G01K 13/00
[52] U.S. Cl. ............................................................ 62/129
[58] Field of Search ........................... 62/129, 130, 125; 116/201, 216, 215, 200; 374/160, 162

[56] References Cited

U.S. PATENT DOCUMENTS

| | | | |
|---|---|---|---|
| 3,175,401 | 3/1965 | Geldmacher | 116/216 |
| 3,260,112 | 7/1966 | Godbey et al. | 116/216 |
| 3,312,079 | 4/1967 | Siebert | 62/130 |
| 3,701,282 | 10/1972 | Peterson | 116/216 |
| 4,028,944 | 6/1977 | Erb | 374/160 |
| 4,743,557 | 5/1988 | Tiru | 436/2 |
| 5,102,233 | 4/1992 | Staerk et al. | 374/160 |
| 5,110,215 | 5/1992 | Labes | 374/162 |
| 5,215,378 | 6/1993 | Manske | 116/216 |
| 5,404,834 | 4/1995 | Murphy | 116/216 |

FOREIGN PATENT DOCUMENTS

| | | |
|---|---|---|
| 3243031 | 5/1984 | Germany . |
| 8802656 | 3/1989 | Germany . |
| 3914599 | 11/1990 | Germany . |

*Primary Examiner*—William E. Tapolcai
*Attorney, Agent, or Firm*—Thompson Hine & Flory LLP

[57] ABSTRACT

A device for checking the temperature within an enclosure when the temperature in the enclose is to be maintained within a range between to extreme values. The device includes a container having a transparent wall and two separate materials giving rise respectively to changes of state at the temperatures equal to the two extreme values, the materials being contained in a container such that detection of the respective states of the two materials can be determiner through the walls of the container.

8 Claims, 1 Drawing Sheet

DEVICE FOR MONITORING THE PREVAILING TEMPERATURE IN AN ENCLOSURE SUCH AS A HOUSEHOLD REFRIGERATOR

BACKGROUND OF THE INVENTION

The invention relates to a particularly simple device for checking the temperature within an enclosure, whenever the temperature has to be maintained in an allowed range between two extreme values. Such may be the case for monitoring the temperature in a refrigeration enclosure, more particularly a refrigerator. As strange as it may seem, most refrigerators are delivered to their customers without a simple device for checking the temperature within these enclosures. Most of these refrigeration enclosures are generally provided with means, especially control knobs, allowing adjustment of the temperature to values which can a priori be stepped over a certain range of values. But the choice of these values for most users is often completely empirical.

However, it is known that in order to preserve food satisfactorily, the temperature has to be maintained, for example within a domestic refrigerator, at a value lying between approximately 2° C. and 60° C.

SUMMARY OF THE INVENTION

The aim of the invention is to produce an extremely simple and inexpensive device enabling users, especially private individuals, to check, easily and immediately, the appropriate character of the temperature within their refrigerator. However, the need for this simple check also arises in other fields, for example in enclosures used for the transportation of food under appropriate refrigeration conditions.

It is without any doubt the extreme simplicity of the device proposed by the invention which constitutes the main advantage thereof. This is because the device for checking the temperature within an enclosure, whenever this temperature has to be maintained within an allowed range between two predetermined extreme values, is characterized in that it comprises, contained in a common container, two separate materials giving rise respectively to changes of state at the temperatures equal to these two extreme values, the check being based on detection of the respective states of these two materials, especially visually when the walls of the container are transparent.

DETAILED DESCRIPTION

Figure 1:
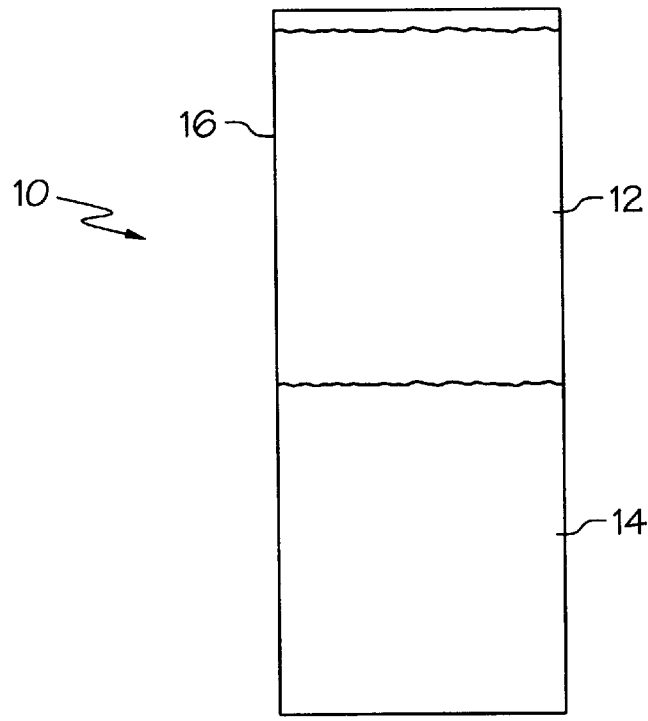
FIG. 1 is a side view illustrating one embodiment of the device of the present invention.

In a first embodiment of the device 10 of the invention as shown in FIG. 1, the two materials 12, 14 have constant melting points, respectively equal to the two abovementioned extreme values, and the check is based on detection of the respective, solid or liquid, states of each of these two materials 12, 14.

Figure 2:
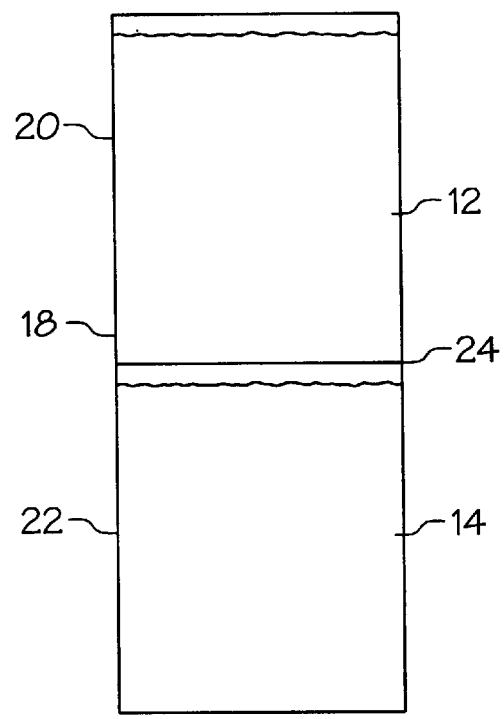
FIG. 2 is a side view illustrating another embodiment of the device of the present invention.

When the two materials are mutually immiscible, they may be contained in one and the same compartment of the container 16 of the kind in question. On the other hand, when they are mutually miscible, as shown in FIG. 2 the container 18 comprises two separate compartments 20, 22, separated from each other, for example, by a partition wall 24 internal to the enclosure 18.

In a first embodiment, the two materials 12, 14 consist of two eutectics whose change-of-state temperatures are respectively equal to the two abovementioned extreme values. When, as in the preferred case of the invention, the device in question is intended for checking the temperature in a refrigeration enclosure, more particularly a domestic refrigerator, one of the two materials may also consist of water, the other then consisting of a eutectic whose melting temperature is advantageously 6° C.

It goes without saying that any narrower (or wider) temperature range may be envisaged, it being understood that in each case materials, especially eutectics capable of changing state at the chosen extreme temperatures, will be used.

The invention may also be interpreted as consisting of a method of immediately checking the effective temperature within the enclosure, this method then comprising the use of the two abovementioned materials and the detection of the solid or liquid states of these two materials.

The invention is therefore one of extreme simplicity. It enables all users of refrigeration enclosures to make use of a particularly inexpensive means for ensuring themselves of the quality of the refrigeration.

It remedies the difficulties encountered more particularly by refrigerator users in ensuring themselves of the correct food preservation conditions, without them even having to wonder about the appropriate temperature range which should be respected, of which range most people are moreover not even aware.

In particular when the two materials are capable of changing from the solid or liquid state or vice versa, nothing could be simpler for the user than noting that both materials are in the solid state (when the refrigeration is excessive), that one of them is in the solid state and the other in the liquid state (when the temperature is suitably adjusted) or finally that both materials are in the liquid state (when the temperature is too high and threatens the quality of the food preservation).

All kinds of shapes may be imagined for the device in question, which may take the form of a gadget which can be used even by children. Although the shape of the container is not really important, it may easily be imagined that suitable shapes may be hermetically sealed cylinders or spheres, which may or may not be divided into separate compartments by transverse partition walls depending on whether the materials are mutually miscible or, on the contrary, immiscible. Noting the respective states of the two materials will be even easier by rotating these cylinders or spheres; turbidity would or would not be observed inside the container, in particular in the case of mutually immiscible materials and at a temperature possibly exceeding the maximum value allowed.

It goes without saying that the device according to the invention may also be permanently fitted, for example near one wall of the refrigeration enclosure.

Although the most favourable conditions of use are those which have just been described, the device according to the invention may also be employed in a slightly more sophisticated system for adjusting the temperature in the enclosures of the kind in question, for example when it is combined with means allowing detection of the changes of states of the said materials and having the capability of producing signals which can be used by the refrigeration device, associated with the above-mentioned refrigeration enclosure, to cause either an additional supply of frigories to be delivered into the enclosure or, on the contrary, a reduction in or momentary interruption of these supplies, until the temperature within the enclosure has been brought back into the allowed temperature range.

There may be an infinite variety of the means of the kind in question, for example electrical circuits into which the above-mentioned materials are inserted, detection relying on the observed variations in resistance depending on whether these materials are in the solid or liquid state, or a device for measuring the variations in intensity of optical beams transmitted through these materials, these variations depending on the solid or liquid state of the said materials.

It was already mentioned earlier that the device according to the invention could be the object of various applications other than those aimed at monitoring the temperature in refrigerators, especially domestic refrigerators, for example in enclosures used for food transportation. It goes without saying that the invention may be applied in conditions similar to the checking of the acceptable character of the temperature in any other form of enclosure, for example a freezer (in which, for example, the two materials of the device according to the invention could (consist of two eutectics whose respective melting points would, for example, be about −15° C. and −25° C.)

What is claimed is:

1. A device for checking the temperature within an enclosure, whenever this temperature has to be maintained within an allowed range between two predetermined extreme values said device comprising a container having a transparent wall and two separate materials giving rise respectively to changes of state at the temperatures equal to these two extreme values, the two separate materials being contained in the container such that detection of the respective states of these two separate materials can be determined through the wall of the container wherein the two separate materials are immiscible and are contained in the same compartment.

2. The device according to claim 1, wherein the two separate materials have constant melting points, respectively equal to the two extreme values, and detection of the respective solid or liquid states of each of these two separate materials indicates the temperature of the enclosure.

3. The device according to claim 1, wherein the two separate materials consist of two eutectics whose change-of-state temperatures are equal to the two extreme positive or negative values.

4. The device according to claim 1 for checking the temperature in a refrigeration enclosure wherein one of the materials consists of water and the other of a eutectic capable of changing from the solid state to the liquid state at the maximum allowed temperature in the refrigeration enclosure.

5. The device according to claim 4, wherein the maximum allowed temperature is 6° C.

6. The device according to claim 1, wherein the container consists of a hermetically sealed cylinder or sphere.

7. A method for checking the effective temperature within a refrigerating enclosure, whenever this temperature has to be maintained within a predetermined range between two extreme values the method comprising the steps of detecting the solid or liquid states respectively of two separate immiscible materials contained in one and the same container wherein the materials give rise to changes of state at temperatures equal to these two extreme values and checking by examining or detecting the respective states of the two materials, whether the effective temperature within the enclosure is within the predetermined range.

8. The method according to claim 7, wherein the melting temperatures correspond to the extreme values of the allowed temperature range and comprising the steps of detecting when the temperature is within the allowed variation range and noting that the material with the lower melting temperature is in the liquid state and the material with the higher melting temperature is in the solid state.

* * * * *